United States Patent
Kekre et al.

(10) Patent No.: US 7,194,487 B1
(45) Date of Patent: Mar. 20, 2007

(54) SYSTEM AND METHOD FOR RECORDING THE ORDER OF A CHANGE CAUSED BY RESTORING A PRIMARY VOLUME DURING ONGOING REPLICATION OF THE PRIMARY VOLUME

(75) Inventors: Anand A. Kekre, Baner (IN); Niranjan S. Pendbarkar, Maharashtra (IN)

(73) Assignee: Veritas Operating Corporation, Mountain View, CA (US)

( * ) Notice: Subject to any disclaimer, the term of this patent is extended or adjusted under 35 U.S.C. 154(b) by 388 days.

(21) Appl. No.: 10/687,104

(22) Filed: Oct. 16, 2003

(51) Int. Cl.
*G06F 17/30* (2006.01)

(52) U.S. Cl. .................................... 707/201

(58) Field of Classification Search ........ 707/200–206; 714/15–20
See application file for complete search history.

(56) References Cited

U.S. PATENT DOCUMENTS

| | | | |
|---|---|---|---|
| 6,173,377 B1 * | 1/2001 | Yanai et al. | 711/162 |
| 6,772,178 B2 * | 8/2004 | Mandal et al. | 707/204 |
| 6,912,629 B1 * | 6/2005 | West et al. | 711/161 |
| 7,017,019 B2 * | 3/2006 | Watanabe et al. | 711/162 |

OTHER PUBLICATIONS

Anand A. Kekre, John A. Colgrove, Oleg Kiselev and Ronald S. Karr, pending U.S. Patent Application entitled "Method and Apparatus for Restoring a Corrupted Data Volume," U.S. Appl. No. 10/254,753, filed Sep. 25, 2002, including Specification: pp. 1-26; Drawings: Figures 1-10 on 7 sheets.

Oleg Kiselev, John A. Colgrove and Anand A. Kekre, pending U.S. Patent Application entitled "Instant Referesh of a Data Volume Copy," U.S. Appl. No. 10/326,427, filed Dec. 19, 2002, including Specification: pp. 1-25; Drawings: Figures 1-11 on 6 sheets.

Anand A. Kekre, Ronald S. Karr and John A. Colgrove, pending U.S. Patent Application entitled "Method and System of Providing Periodic Replication," U.S. Appl. No. 10/436,354, filed May 12, 2003, including Specification: pp. 1-20; Drawings: Figures 1-5 on 5 sheets.

Arvind Arun Pande, Saurabh Ramchandra Godbole and Anand A. Kekre, pending U.S. Patent Application entitled "Propagating Results of a Volume-Changing Operation to Replicated Nodes," U.S. Appl. No. 10/675,505, filed Sep. 30, 2003, including Specification: pp. 1-30; Drawings: Figures 1-7 on 14 sheets.

* cited by examiner

*Primary Examiner*—Greta Robinson
*Assistant Examiner*—Cheryl Lewis
(74) *Attorney, Agent, or Firm*—Brenna A. Brock; Campbell Stephenson Ascolese LLP (57) ABSTRACT

A method may involve replicating a first change made to a primary volume. The first change is replicated to a secondary volume. A second change made to the primary volume is also replicated to the secondary volume. The second change is caused by a restore operation. Replicating the second change to the secondary volume involves recording an order of the second change relative to the first change.

24 Claims, 7 Drawing Sheets

| T = T4 | Primary Volume 150A | Current Volume Map 302A | Next Volume Map 302B | COW Snapshot 304 | Secondary Volume 150B |
|---|---|---|---|---|---|
| | A0 | 0 | 1 | A1 | A1 |
| | B0 | 1 | 1 | B2 | B2 |
| | C0 > C1 | 0 | 1 | C0 | C0 |
| | D0 | 0 | 1 | D1 | D1 |

| T = T5 | Primary Volume 150A | Current Volume Map 302A | Next Volume Map 302B | COW Snapshot 304 | Secondary Volume 150B |
|---|---|---|---|---|---|
| | A0 | 1 | 0 | | A1 > A0 |
| | B0 | 1 | 0 | | B2 > B0 |
| | C1 | 1 | 0 | | C0 > C1 |
| | D0 | 1 | 0 | | D1 > D0 |

| T = T6 | Primary Volume 150A | Current Volume Map 302A | Next Volume Map 302B | COW Snapshot 304 | Secondary Volume 150B |
|---|---|---|---|---|---|
| | A0 | 1 | 0 | | A0 |
| | B0 > B3 | 1 | 1 | B0 | B0 |
| | C1 > C2 | 1 | 1 | C1 | C1 |
| | D0 | 1 | 0 | | D0 |

SYSTEM AND METHOD FOR RECORDING THE ORDER OF A CHANGE CAUSED BY RESTORING A PRIMARY VOLUME DURING ONGOING REPLICATION OF THE PRIMARY VOLUME

FIELD OF THE INVENTION

This invention relates to data processing systems and, more particularly, to maintaining replication consistency within a data processing system if the volume being replicated is restored.

BACKGROUND

Data replication is a technique used to maintain copies of data at separate locations. For example, data can be replicated on several different sites within a corporation's campus and/or on several different ones of the corporation's campuses. If the data is replicated at different sites, and if the failure of the systems storing the data at one site is unlikely to cause the failure of the corresponding systems at another site, replication can provide increased data reliability. Thus, if a disaster occurs at one site, an application that uses that data can be restarted using a replicated copy of the data at another site.

Replication can be performed on data volumes by designating one volume as the primary volume. One or more secondary volumes are then synchronized with the primary volume. These secondary volumes can each be located at a different secondary site. Initially, a secondary volume can be synchronized to the primary volume by copying all of the data on the primary volume to the secondary volume. The data on the primary volume can be copied to the secondary volume by transferring all the data over the network, by creating a backup of the primary volume and restoring the secondary volume from the backup, or by attaching one or more mirrors of the primary volume to the secondary volume. Replication then continues by propagating any changes to data in the primary volume to the second volumes. For example, synchronous data replication can be performed by preventing the completion of an application-initiated write to the primary volume until the write has been applied to the primary volume and to all of the secondary volumes.

During replication, it is often critically important to maintain consistency between the primary volume and the secondary volume. Consistency ensures that, even if the secondary volume is not identical to the first volume (e.g., updates to the secondary volume may lag behind updates to the primary volume), the secondary volume always represents a state of the primary volume that actually existed at a previous point in time. For example, if an application performs a sequence of writes A, B, and C to the primary volume, consistency can be maintained by performing these writes to the secondary volume in the same sequence. At no point should the secondary volume reflect a state, such as would have occurred if write C was performed before write B, that never actually occurred on the primary volume.

Another technique, in addition to replication, that may be used to increase the reliability and/or accessibility of data involves creating point-in-time copies of a data volume. These point-in-time copies protect the data on the data volume against logical or physical damage. Examples of point-in-time copies include snapshots (like copy-on-write snapshots and mirror-breakoff snapshots) and backups. Each of these point-in-time copies allows the volume to be restored to its state at an earlier point-in-time. For example, if the volume is corrupted at 8 PM, the volume can be restored from a point-in-time copy of the volume that was created at 7 PM on the same day.

If a primary volume that is being replicated is restored from a previously created point-in-time copy of itself, the secondary volume becomes inconsistent with respect to the primary volume. For example, the software that controls replication may not detect that the primary volume is being restored from a point-in-time copy, and thus changes to the primary volume due to the restore may not be replicated to the secondary volume. Such inconsistencies can remain until the secondary volume is again fully resynchronized with the primary volume. During the time in which the secondary volume is inconsistent with the primary volume, the data stored by the secondary volume is not useable to restart an application that uses that data to a known stable state. Thus, if the primary volume fails during this time or if there is a disaster at the primary site, there may be no way to use the secondary volume to restart the application since the secondary volume is not guaranteed to be consistent with any known state of the primary volume. As this example shows, it is desirable to be able to maintain consistency between the primary volume and any secondary volumes, even if the primary volume is restored while replication is ongoing.

SUMMARY

Various embodiments of systems and methods are disclosed for recording the order of a change, which is caused by performing a restore operation on a primary volume, relative to another change to the primary volume during ongoing replication of the primary volume. The change caused by the restore operation and the other change can then be applied to a secondary volume, which is a replica of the primary volume, in the same order. This allows the secondary volume to maintain consistency with respect to a known state of the primary volume. Accordingly, in at least some such systems and methods, recording the order of the change(s) due to a restore operation relative to other changes allows a restore operation to be performed to a data volume without disrupting ongoing replication of that data volume.

In some embodiments, a method involves replicating a first change made to a primary volume. The first change is replicated to a secondary volume. A second change made to the primary volume is also replicated to the secondary volume. The second change is caused by a restore operation. Replicating the second change to the secondary volume involves recording an order of the second change relative to the first change.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

During replication of a primary volume to a secondary volume, a restore operation may be performed. The restore operation causes the primary volume to be restored from a previously-generated point-in-time copy of the primary volume, which changes one or more regions of the primary volume. However, the changes caused by the restore operation may not be ordered relative to each other. The replication process records the order of the changes caused by the restore operation relative to the other changes being replicated. By recording this order, the replication process can maintain the data consistency on the secondary volume. For example, if the replication process is periodically replicating changes, the replication process records the order by indicating that the changes caused by the restore operation occurred within a particular replication period. This in turn indicates that the changes caused by the restore operation are ordered before changes in a subsequent period and after changes in a previous period. If instead the replication process is performing replication on an operation-by-operation basis (e.g., by performing asynchronous replication), the replication process can record the order of the changes due to the restore operation relative to the order of one or more other changes, such as those caused by an application performing a write operation to the primary volume.

Data on a secondary volume is consistent with respect to a known state of the primary volume if the secondary volume reflects all updates to the primary volume up to a point in time and no updates that were applied to the primary volume after that point in time. The data on the secondary volume is consistent so long as these conditions are met, even if the secondary volume lags behind the primary volume. For example, if the data being replicated includes a file system, the most recently created files may be missing when the file system is restarted from a consistent secondary volume. If the secondary volume is consistent with a known state of the primary volume, an application using that data can be successfully restarted to a known, usable state from the secondary volume.

Figure 1:
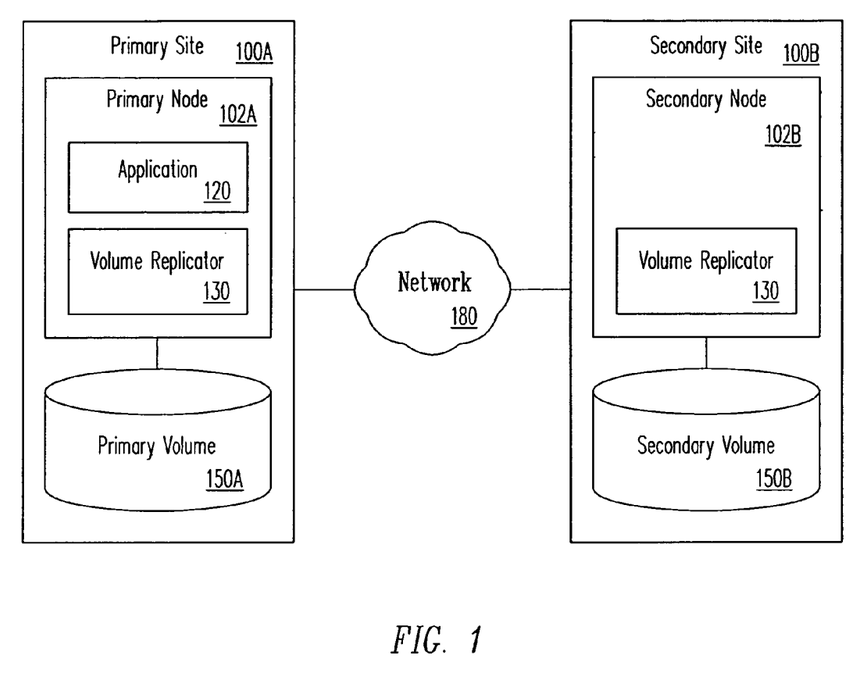
FIG. 1 shows a system that replicates data from a primary site to a secondary site, according to an embodiment of the present invention.

FIG. 1 shows a system that performs replication of a primary volume to a secondary volume. This system includes primary site 100A and secondary site 100B. Collectively, sites 100A and 100B are referred to as sites 100. Site 100A includes at least one primary node 102A, which implements the functionality of application 120 and volume replicator 130. Site 100A also includes a primary volume 150A. Site 100B includes at least one secondary node 102B, which implements the functionality of volume replicator 130, and a secondary volume 150B. Primary site 100A and secondary site 100B are coupled by network 180. Network 180 can include a WAN (Wide Area Network), such as the Internet, one or more LANs (Local Area Networks), and/or one or more SANs (Storage Area Networks).

Each node 102A and 102B (collectively, nodes 102) can include one or more computing devices configured to execute software implementing application 120 and/or volume replicator 130. In such embodiments, nodes 102 can include a workstation, personal computer, server, PDA (Personal Digital Assistant), cell phone, storage network switch, storage device, storage array controller, or any other device configured to execute software implementing application 120 and/or volume replicator 130. Alternatively, each node 102 can be implemented as a logic device configured to perform the functions of application 120 and/or volume replicator 130. Nodes 102 can also be implemented using logic devices that are configured to perform some of the functions of application 120 and/or volume replicator 130 and that are also configured to execute software implementing other functions of application 120 and/or volume replicator 130.

Volume replicator 130 replicates data included in primary volume 150A on one or more secondary volumes 150B (for simplicity, only one such secondary volume is illustrated). Volume replicator 130 is implemented as a clustered application in some embodiments (e.g., several nodes may each implement an instance of volume replicator 130, and each instance coordinates certain activities with the other instances). Volume replicator 130 can be implemented as part of a virtualization component such as VERITAS Volume Manager™. A virtualization component, which can be implemented in hardware, software, or a combination of the two, creates and manages one or more logical storage devices, called volumes, such as primary volume 150A and secondary volume 150A. The virtualization component can be either in-band (e.g., the virtualization component can implemented in the data path of data being written to the volumes) or out-of-band (e.g., the virtualization component can sit outside the data path). Applications such as databases and file systems view and access the logical volumes managed by the virtualization component in the same way that the applications would view and access physical storage devices.

Each data volume 150A and 150B can be implemented on one or more physical storage devices. A physical storage device can be a single device (e.g., a single hard drive, CD (Compact Disc) drive, or DVD (Digital Versatile Disc) drive). Alternatively, a storage device may include an array of such devices (e.g., a RAID array of several hard drives controlled by a hardware array controller). Also, portions of more than one data volume can be implemented on the same physical storage device.

While FIG. 1 illustrates a system configured to replicate a single data volume, other embodiments support replication of multiple data volumes. In such embodiments, the group of data volumes at the primary site 100A to be replicated is included in a primary replication volume group. This primary replication volume group can then be replicated to a corresponding group of volumes, called the secondary replication volume group, at the secondary site 100B. Volume replicator 130 can record the order of changes across all the volumes within the primary replication volume group and apply those changes to the corresponding volumes within the secondary replication volume group in the same order. This provides consistency for data used by an application that performs writes to several data volumes in a specific order. For example, if a database application posts changes to a log before writing to a space table, and if the log and the space table are implemented on different volumes, volume replicator 130 can record the order of changes to the space table relative to the order of changes to the log. This may provide consistency between the secondary replication volume group and the primary replication volume group, both within each volume and among all the volumes in each replication volume group.

In some embodiments, there are multiple secondary volumes 150B (or replication volume groups) to which volume replicator 130 replicates data in primary volume 150A (or a primary replication volume group). Identical replication operations are typically performed to all secondary volumes.

As mentioned above, volume replicator 130 is configured to maintain secondary volume 150B as a replica of primary volume 150A. Volume replicator 130 monitors activity that modifies primary volume 150A (e.g., write activity initiated by application 120). If modifications to primary volume 150A are detected, volume replicator 130 causes those modifications to be applied to secondary volume 150B. For example, if application 120 writes to a block of primary volume 150A, volume replicator 130 can cause the same write to be performed to the corresponding block of secondary volume 150B by communicating information indicating the change (e.g., the address, the write command, and the new value of the block) across network 180 to secondary site 100B.

Volume replicator 130 can perform replication using various different replication techniques (or a combination of such techniques). One replication technique involves periodic replication. In periodic replication, volume replicator 130 records changes to the primary volume for a particular period. At the end of that period, volume replicator 130 begins recording changes that occur during a new period. During the new period, the changes recorded during the previous period are applied to the secondary volume. The order of changes within a given period may not be recorded relative to each other, but changes in a given period are ordered relative to changes within other periods. More details describing a particular periodic replication technique can be found in U.S. patent application Ser. No. 10/436,354, titled "Method and System of Providing Periodic Replication", filed May 12, 2003 by Anand A. Kekre, Ronald S. Karr, and John A. Colgrove, which is incorporated by reference herein in its entirety.

Another replication technique involves asynchronous replication. This technique involves replicating individual changes in the order those changes were made to the primary volume. A change caused by a given operation, such as a write initiated by application 120, can be communicated to secondary site 100B in order to apply the change to secondary volume 150B after the given operation has already completed on primary volume 150A, and thus the replication of the change is asynchronous with the completion of the operation that causes the change. During asynchronous replication, the order of each operation that causes a change on the primary volume is recorded relative to the order of each other operation.

Figure 2:
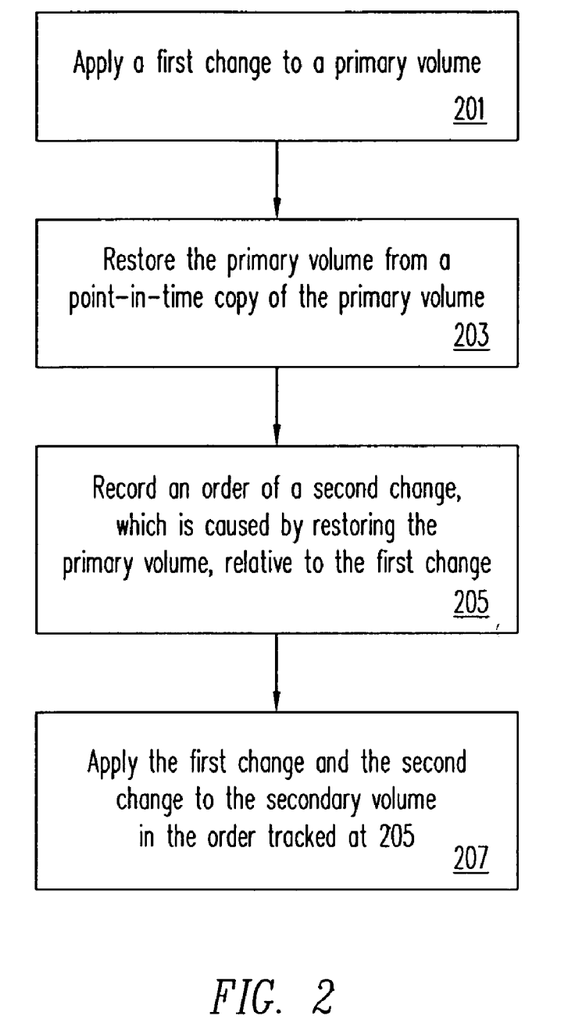
FIG. 2 is a flowchart of a method of replicating data from a primary volume to a secondary volume by recording an order of a change caused by restoring the primary volume relative to the order of another change to the primary volume, according to an embodiment of the present invention.

FIG. 2 is a flowchart of a method of recording the order of changes caused by restoring the primary volume while replicating the primary volume to a secondary volume. It is noted that the functions performed in blocks 201–207 can be performed in a different order than that shown in FIG. 2, and that the use of the terms "first" and "second" to describe different changes to the primary volume is meant to merely differentiate between the changes and in no way implies an order between the changes (i.e., the first change can be applied to the primary volume after than second change is applied to the primary volume).

At 201, a first change is applied to the primary volume. This change can be caused, for example, by an application writing to the primary volume.

At 203, the primary volume is restored from a point-in-time copy of the primary volume. The point-in-time copy can be a snapshot, backup, or other representation of the primary volume at a previous point in time. The restore can be initiated, for example, in response to detecting corruption of data in the primary volume. Restoring the primary volume from the point-in-time copy causes one or more changes on the primary volume (e.g., a region of the primary volume may be overwritten with a new value when that region is restored from the point-in-time copy).

In some embodiments, the restore is performed as an instant restore operation. Changes caused by an instant restore operation appear to happen instantaneously from the viewpoint of an application accessing the volume being restored. Additionally, an application using the volume can continue to access the volume normally while background activity performs the data movement necessary to update the volume according to the instant restore operation. For example, if the application reads a portion of the primary volume modified by the instant restore operation, background activity needed to actually perform the modification to that portion of the primary volume may not yet have completed. However, the application's read may be remapped to the portion of the point-in-time copy that contains the correct value of that portion of the primary volume. The application is unaware that its access has been remapped. Accordingly, from the application's viewpoint, the instant restore operation has already completed, even though the background activity is still ongoing. More details regarding a technique for performing instant restore operations can be found in U.S. patent application Ser. No. 10/254,753, U.S. Pat. No. 6,912,631 titled "Method and Apparatus for Restoring a Corrupted Data Volume", filed Sep. 25, 2002 by Anand A. Kekre, John Colgrove, Oleg Kiselev, and Ronald S. Karr, which is incorporated by reference herein in its entirety.

The order of a second change, which is caused by the restore performed at 203, relative to the first change is recorded, as shown at 205. The second change may be included in a group of changes caused by restoring the primary volume. For example, when the primary volume is restored, several discontinuous regions of the primary volume may be modified. The second change is the modification to all or part of one of those regions. Recording the order of the second change relative to the first change can involve associating a sequence number with information representing the second change. The value of the sequence number associated with the second change can be compared with the value of a sequence number associated with the first change to determine whether the second change occurred before or after the first change. In asynchronous replication, a single entry in a change log can be allocated to all of the changes caused by restoring the primary volume, and this entry can be assigned a single sequence number. In periodic replication, recording the order of the first change relative to the second change can involve storing information indicating that each change occurred during a particular period of periodic replication. This can involve identifying each region changed by performing the restore operation in a particular volume map that corresponds to the primary volume. This volume map indicates all changes to the primary volume that are detected during a particular period of periodic replication. If the first change is indicated in a different volume map than the second change, it indicates that the first change occurred in a different period than the second change.

At 207, the first change and the second change are applied to the secondary volume in the order recorded at 205. Thus, these changes are replicated to the secondary volume in the same logical order that they were applied to the primary volume. Accordingly, the secondary volume maintains consistency with the primary volume. It is noted that the second change may be one of many changes caused by the restore operation, and these changes may not be ordered relative to each other. For example, the changes may have been logically been applied to the primary volume at the same time, even though each individual change was actually applied to the primary volume at a different time than each other individual change. The data movement needed to provide the new values of the data affected by these changes to the secondary volume may not occur in the same order as these changes were applied to the primary volume. However, all of the changes are logically applied to the secondary volume at the same time. Additionally, all of these changes are applied in the same order, recorded at 205, relative to the first change (e.g., all of the changes caused by the restore operation are applied before the first change if the order recorded at 205 indicates that the second change should be applied before the first change).

Figure 3:
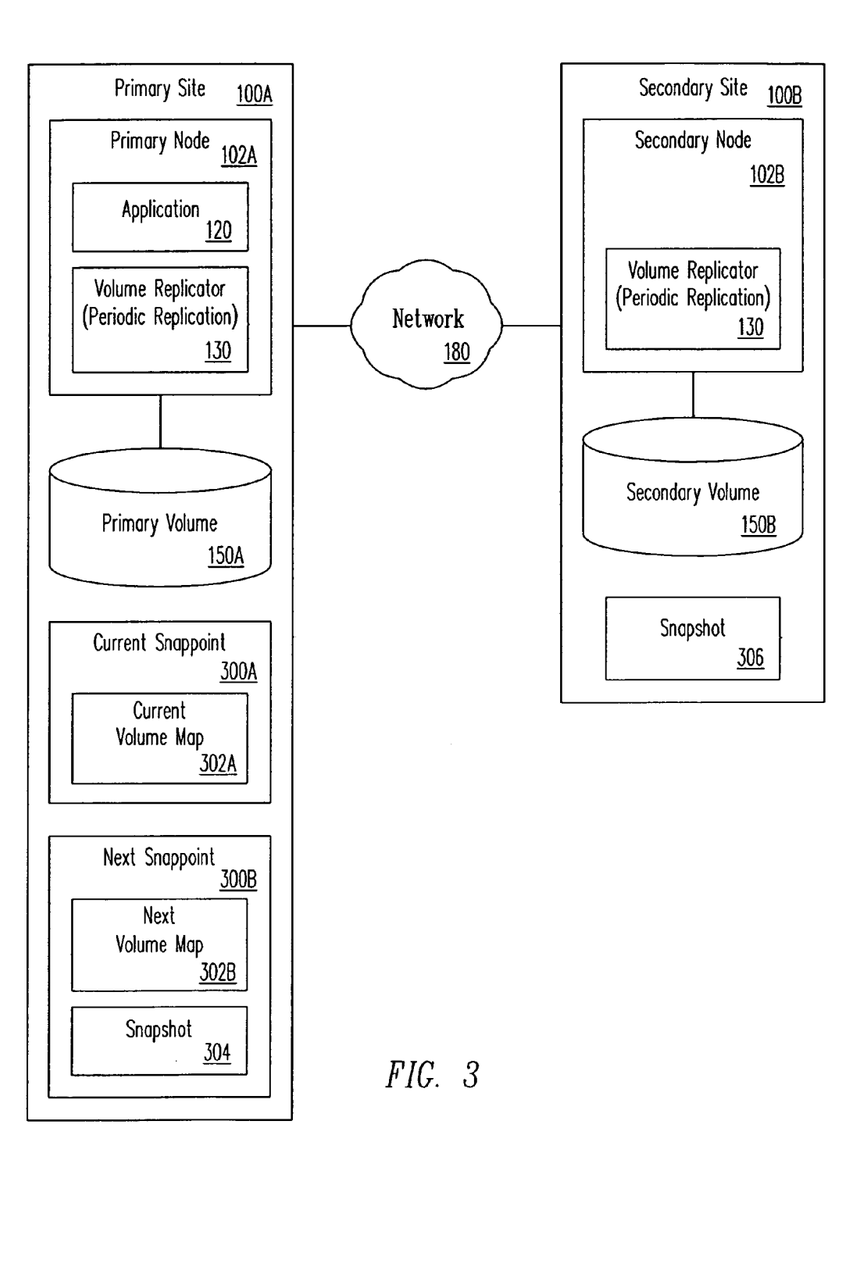
FIG. 3 shows a system that performs periodic replication, according to an embodiment of the present invention.

FIG. 3 illustrates a system in which volume replicator 130 performs periodic replication. At primary site 100A, volume replicator 130 manages two snappoints, current snappoint 300A and next snappoint 300B, of primary volume 150A. Each snappoint provides information about the changes to primary volume 150A with respect to a point-in-time copy of that volume. Each snappoint includes information indicating which portions of the primary volume 150A have been modified after the point in time of that snappoint's creation and prior to the point in time of a subsequent snappoint's creation. Current snappoint 300A maintains this information in current volume map 302A. Next snappoint 300B maintains information indicative of changes to the primary volume 150A subsequent to the creation of next snappoint 300B in next volume map 302B. Snappoints such as current snappoint 300A and next snappoint 300B provide applications the ability to create incremental images of primary volume 150A, retrieve the information about the changed regions between any two images, and extract the changed regions.

Current volume map 302A can be a bitmap in which each bit represents a region of primary volume 150A. The value (e.g., set or clear) of each bit in such a bitmap indicates whether the region corresponding to that bit was modified during the period recorded by current snappoint 300A. Next volume map 302B can also be implemented as a bitmap. It is noted that in alternative embodiments, structures other than bitmaps may be used to implement current volume map 302A and/or next volume map 302B. For example, in one embodiment, current volume map 302A may include a list of regions of primary volume 150A modified during the period recorded by current snappoint 300A. Each region can be identified as an extent. Each extent is identified using a starting address and a value representing the length of the extent (in embodiments that only support a single extent length, the value representing the length may be omitted).

Each snappoint 300A and/or 300B can also include information indicative of a particular state of the primary volume at the point in time of that snappoint's creation. For example, next snappoint 300B includes a snapshot 304 of the primary volume at the point-in-time at which next snappoint 300B was created. Snapshot 304 can be a Copy-On-Write (COW) snapshot. If snapshot 304 is a COW snapshot, snapshot 304 includes the original values of any regions of primary volume 150A modified subsequent to the creation of the snapshot. For example, after snapshot 304 is created, application 120 may write to a block of primary volume 150A. Before the block is overwritten with the new value provided by application 120, the original value of the block is copied to COW snapshot 304. Information in snapshot 304 indicating which block was modified is also updated in response to the write. In one embodiment, snapshot 304 is generated using the technique described in U.S. patent application Ser. No. 10/143,059, U.S. Pat. No. 6,785,789 titled "Method and Apparatus for Creating a Virtual Data Copy", filed May 10, 2002 by Anand A. Kekre, John A. Colgrove, Oleg Kiselev, Ronald S. Karr, and Niranjan S. Pendharkar.

In the illustrated example, current snappoint 300A is a dataless snappoint and next snappoint 300B is a dataful snappoint. Current snappoint 300A is 'dataless' in that it lacks any data representing a point-in-time copy of primary volume 150A at the time when snappoint 300A was created. Next snappoint 300B is 'dataful' in that it includes data (here, snapshot 304) representing a point-in-time copy of primary volume 150A at the time when snappoint 300B was created.

Current snappoint 300A is created before next snappoint 300B. Current snappoint 300A records changes to primary volume 150A between the point in time of the current snappoint's creation and the point in time at which next snappoint 300B is created. Next snappoint 300B records the changes to the primary volume 150A subsequent to that point in time. When a new next snappoint is created (e.g., the new next snappoint can be created when a new replication period begins, as described below), the current snappoint 300A will be replaced with next snappoint 300B (i.e., the snappoint that was previously named next snappoint 300B becomes the current snappoint). When next snappoint 300B is converted to current snappoint 300A, next snappoint 300B can also be converted to a dataless snappoint. Snapshot 304 can be cleared for reuse as part of the new next snappoint. The information previously stored in current snappoint 300A may be saved for later use or discarded. After next snappoint 300B has been converted to current snappoint 300A, a new version of next snappoint 300B is created.

Volume replicator 130 also manages snapshot 306 of secondary volume 150B. Snapshot 306 represents a point-in-time copy of secondary volume 150B. Snapshot 306 may be a COW snapshot in some embodiments.

To perform periodic replication of primary volume 150A to secondary volume 150B, volume replicator 130 creates snapshot 306 of the secondary volume 150B. Volume replicator 130 then transfers the data stored in the regions of primary volume 150A that current snappoint 300A identifies as having been modified. The data is read from snapshot 304 and then transferred to secondary site 100B via network 180. The transferred data is applied to the corresponding regions of snapshot 306. Secondary volume 150B is then restored (e.g., by performing an instant restore operation) from snapshot 306. This process then repeats periodically. For example, each time a new version of current snappoint 300A is created, snapshot 306 can be refreshed with secondary volume 150B, the data identified by current volume map 302A can be applied to snapshot 306, and secondary volume 150B can be restored from the updated snapshot. Snapshot 306 can be refreshed using a technique such as the one described in U.S. patent application Ser. No. 10/326,427, U.S. Pat. No. 6,880,053 titled "Instant Refresh of a Data Volume Copy", filed Dec. 19, 2002 by Oleg Kiselev, John A. Colgrove, and Anand A. Kekre, which is incorporated by reference herein in its entirety. As an alternative to refreshing snapshot 306, snapshot 306 can be deleted and a new version of snapshot 306 can be created.

Periods in periodic replication can be defined in terms of time, number of operations, volume of modified data, and/or other criteria. For example, in one embodiment, replication is performed every 10 seconds. In other words, a new next snappoint is created every 10 seconds, causing the old version of the next snappoint to become the current snappoint and the changes indicated in the new current snappoint to be applied to the secondary volume. In another example, replication is performed each time 25 operations modifying the primary volume complete. In yet another example, replication is performed each time 256 Kbytes of data is modified. Several criteria can be combined to define a replication period. For example, replication can be triggered as soon as either 10 seconds elapse or 25 operations to primary volume 150A complete.

If primary volume 150A is restored from a point-in-time copy, volume replicator 130 records the changes caused by the restore. Volume replicator 130 records these changes by updating next volume map 302B in next snappoint 300B to indicate each region of primary volume 150A modified by the restore. In some embodiments, volume replicator 130 updates the next snappoint to indicate each region changed by the restore operation as an atomic operation (in an atomic operation, either all of the operation is performed or none of the operation is performed, i.e., an atomic operation cannot only partially take effect).

If next volume map 302B is implemented as a list of regions, volume replicator 130 may update next volume map 302B to reflect the restore by appending a list of regions modified by the restore to next volume map 302B. Alternatively, if next volume map 302B is implemented as a bitmap, volume replicator 130 can update next volume map 302A to indicate the changes caused by the instant restore by bitwise logically ORing a restore bitmap with the next volume map 302A and storing the result in next volume map 302A. The restore bitmap indicates which portions of primary volume 150A are affected by the restore information. The restore bitmap is generated by the restore operation or by volume replicator 130. The restore bitmap can be generated in a variety of different ways. For example, the restore bitmap can be generated from one or more volume maps, each of which records changes to primary volume 150A and/or the snapshot from which primary volume 150A is being restored. As another example, in an embodiment that implements snappoints (e.g., such as those described above for use in performing periodic replication), a restore bitmap is obtained by bitwise logically ORing bitmaps included in each of a series of snappoints. The first snappoint in the series is created at the same time as the point-in-time copy of the primary volume from which primary volume 150A is being restored. The bitmap in each subsequent snappoint in the series indicates which regions of the primary volume changed during the time that snappoint was active (a snappoint is 'active' from the time it is created until the point-in-time at which a subsequent snappoint is created). It is noted that if there is only one snappoint in the series, the restore bitmap is the same as the bitmap in that snappoint. If the snapshot from which the primary volume is being restored was written to at some point subsequent to the creation of that snapshot, additional processing is needed to generate the restore bitmap (e.g., in addition to ORing bitmaps representing changes to the primary volume, one or more bitmaps representing changes to the snapshot may also be ORed to generate the restore bitmap).

Volume replicator 130 continues to manage periodic replication normally while a restore operation is performed on primary volume 150A. Thus, if application 120 writes to primary volume 150A after the restore operation is initiated, next volume map 302B is updated to indicate the region targeted by the write operation. When a new replication period begins after the period in which the changes caused by the restore operation were identified in next volume map 302B, volume replicator 130 converts next snappoint 300B to current snappoint 300A and replicates the changes indicated in the new current snappoint to secondary volume 150B.

By updating next snappoint 300B to indicate the regions modified by the restore, volume replicator 130 records the order of the changes caused by the restore relative to the order of other changes to the primary volume. For example, if next snappoint 300B indicates that a particular region of primary volume 150A has been changed, that indicates that the change occurred in an order subsequent to a change indicated in current snappoint 300A. Updating next snappoint 300B also indicates that the regions of secondary volume 150B corresponding to the identified regions in next snappoint 300B should be resynchronized with primary volume 150A in the next synchronization period (e.g., when next snappoint 300B is converted to current snappoint 300A). If two changes are identified in the same snappoint, it indicates that those changes should be applied to the secondary volume at the same time (e.g., by applying all of the changes identified in that snappoint to the secondary volume as an atomic operation).

When the restore operation is an instant restore operation, the replication of the regions indicated as having been modified by the restore operation occurs independently of whether background activity implementing the instant restore operation has already updated the regions on the primary volume. For example, if the post-instant-restore value of a region has still not been copied from the point-in-time copy to the primary volume when volume replication 130 accesses that region in order to transfer its value across network 180 to secondary site 200B, volume replicator 130 can obtain the correct value of that region from the point-in-time copy. The volume replicator's read to the primary volume is redirected to the point-in-time copy automatically. This redirection is achieved by the same mechanisms that would redirect a similar read from application 120 when the read targets a region of the primary volume affected by the instant restore operation but not yet copied from the point-in-time copy.

Figure 4A:
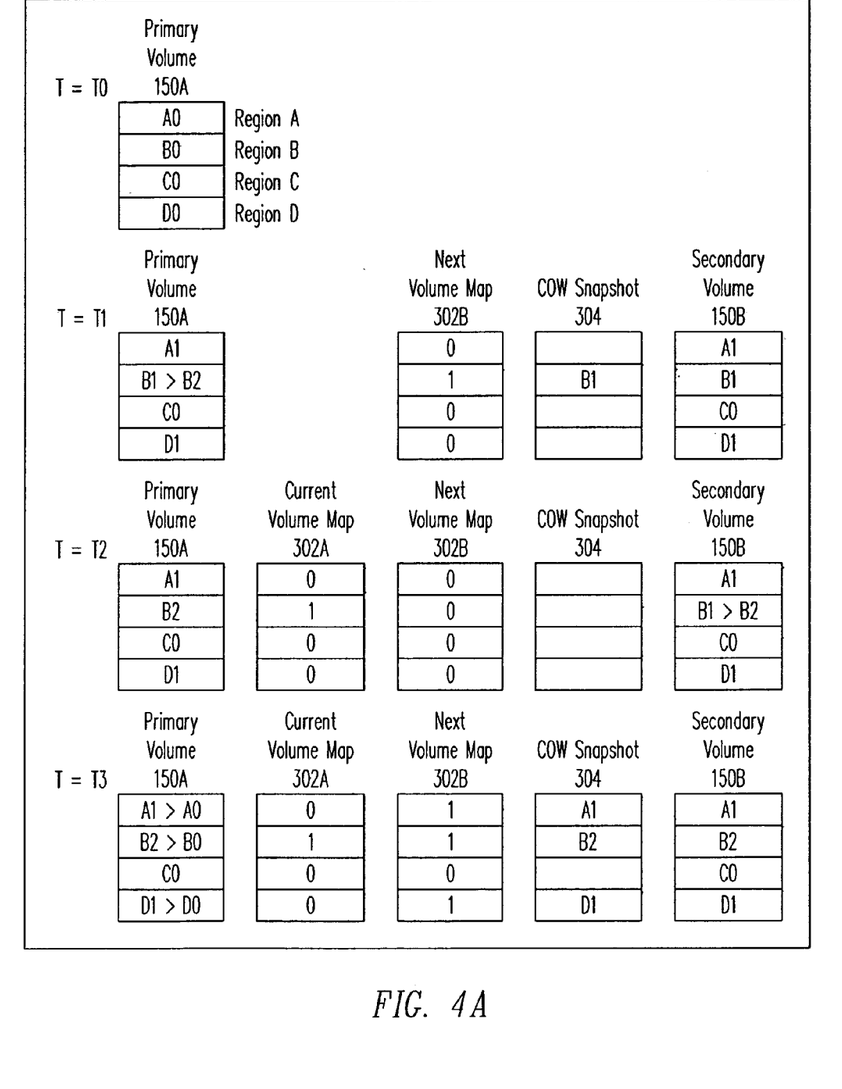
FIGS. 4A–4B illustrate an example of how periodic replication is performed, according to an embodiment of the present invention.
Figure 4B:
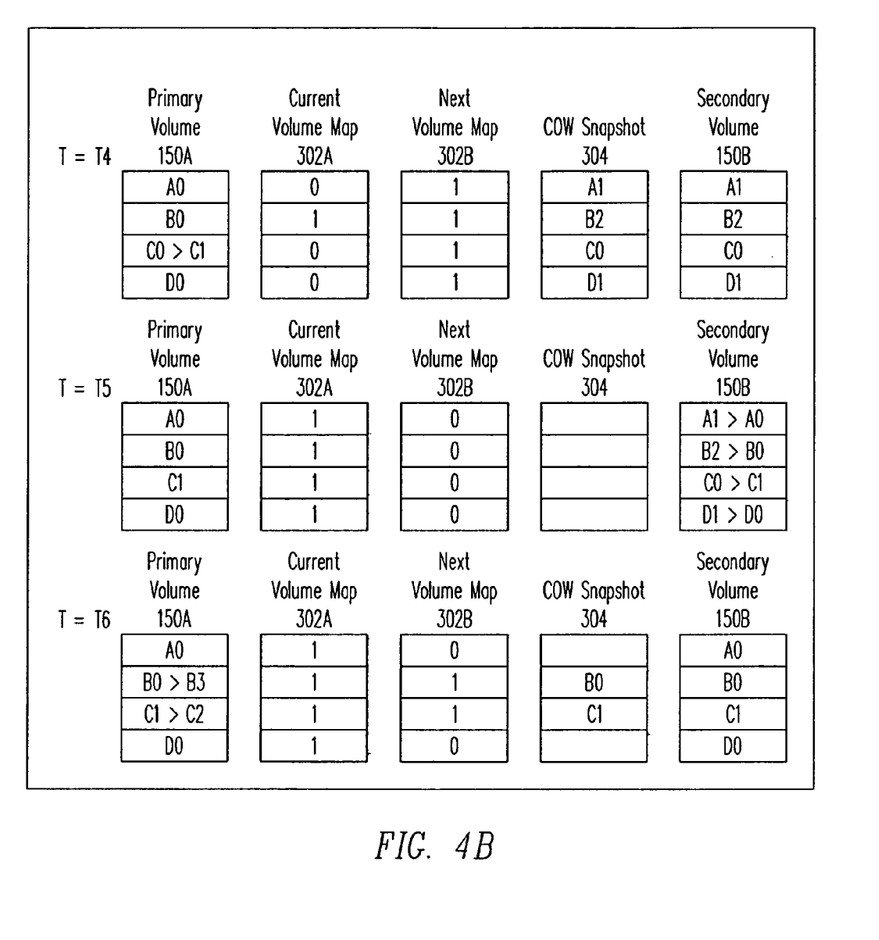

FIGS. 4A–4B show a simplified example of how changes caused by an instant restore can be recorded during periodic replication. FIG. 4A illustrates various states of primary volume 150A, current volume map 302A, next volume map 302B, snapshot 304, and/or secondary volume 150B at times T0–T3, and FIG. 4B illustrates times T4–T6. A point-in-time copy (not shown) of primary volume 150A is created at time T0. The point-in-time copy indicates the values A0, B0, C0, and D0 of each of four regions (regions A–D) of primary volume 150A. It is noted that other embodiments may involve significantly larger numbers of regions.

At time T1, regions A–D of primary volume 150A have the values A1, B1, C0, and D1 respectively. Starting at T1, primary volume 150A is replicated to secondary volume 150A. To begin replication, secondary volume 150B is synchronized with primary volume 150A, and thus each region A–D of secondary volume 150B is set to the same value as the corresponding region A–D of primary volume 150A. A next snappoint, which includes next volume map 302B and snapshot 304, is initialized at the same site as the primary volume. Snapshot 304 is a COW snapshot in this example.

Between T1 and T2, region B of primary volume 150A is modified. Subsequent to the modification, region B of primary volume 150A has value B2. In response to this change, next volume map 302A is updated to indicate that region B has been modified. Since snapshot 304 is a COW snapshot, the original value of region B (at time T1) is copied to snapshot 304.

At time T2, a new replication period begins and the next snappoint is converted to a dataless current snappoint. As a result, current volume map 302A identifies the regions of primary volume 150A modified between T1 and T2 (which were identified by next volume map 302A up until time T2). A new next snappoint is initialized, and thus next volume map 302A is cleared to indicate that no regions of primary volume 150A have been modified since time T2. Snapshot 304 is refreshed or a new version of snapshot 304 is created.

When the new replication period begins at time T2, the changes indicated in the current snappoint are copied to the secondary site and applied to secondary volume 150B. Since current volume map 302A indicates that region B was changed between time T1 and time T2, this change is replicated to secondary volume 150B by reading the value of region B from snapshot 304 and applying this value to region B of secondary volume 150B.

At time T3, replication of the changes indicated in the current volume map 302A has completed, and thus secondary volume 150B is in a state that is consistent with the state of primary volume 150A at time T2. Between time T3 and time T4, primary volume 150A is restored from the point-in-time copy of primary volume 150A generated at time T0. Thus, region A is modified from having value A1 to having value A0. Region B is similarly modified from having value B2 to having value B0. Region C has the same value as it has in the point-in-time copy, so region C is not changed by the restore operation. Region D is changed from having value D1 to having value D0.

In response to the restore operation, next volume map 302B is updated to indicate that regions A, B, and D have been modified subsequent to time T3 and the original values of these regions (at the beginning of this replication period at time T2) are copied to snapshot 304. These changes can be recorded in next volume map 302B by bitwise logically ORing each bit in next volume map 302B with a corresponding bit in a restore map that indicates which region of primary volume 150A had different values than the corresponding regions of the point-in-time copy generated at time T0 and storing the results of the bitwise logical OR in next volume map 302B. It is noted that if the primary volume is restored by performing an instant restore operation, these changes to regions A, B, and D are marked in the next volume map as soon as the instant restore operation completes, even if background activity needed to actually update these regions of primary volume 150A has not yet completed. By marking these changes in next volume map 302B, the order of these changes is recorded relative to the order of, for example, the changes indicated in current volume map 302A and the changes that will be indicated in subsequent versions of next volume map 302B.

At time T4, region C on primary volume 150A is changed (e.g., by an application writing a new value to region C) from having value C0 to having value C1. This change is also recorded in next volume map 302B, and the original value of region C is copied from primary volume 150A to snapshot 304. By updating next volume map 302B to indicate this change in addition to indicating the changes caused by the restore operation, it indicates that this change should be applied to secondary volume 150B at the same time as the changes caused by the restore operation.

At time T5, a new replication period begins. Next volume map 302B is converted to dataless current volume map 302A and snapshot 304 is cleared. A new version of next volume map 302B is initialized. The volume replicator begins transferring the values of the regions that current volume map 302A indicates as having been changed in the previous replication period to the secondary site. The volume replicator can apply these changes to a snapshot (not shown) of secondary volume 150B generated at time T5. When all of the changes indicated in current volume map 302A have been applied to the snapshot of secondary volume 150B, the volume replicator can perform an instant restore operation to restore secondary volume 150B from the updated snapshot, atomically applying the changes indicated in current volume map 302A to secondary volume 150B. Thus, between times T5 and T6, secondary volume 150A is updated to a state that is consistent with the state of primary volume 150A at time T5.

At time T6, periodic replication continues. Two regions, region B and region C, of primary volume 150A are modified subsequent to time T6. Next volume map 302A is updated to indicate that these regions were modified during this replication period, and the original values of these regions (at T5, which is the beginning of this replication period) are copied to snapshot 304. If the replication of the changes indicated in current volume map 302A had not yet completed, the value of these regions could be accessed from snapshot 304 and then transferred to the secondary site for application to secondary volume 150B.

Figure 5:
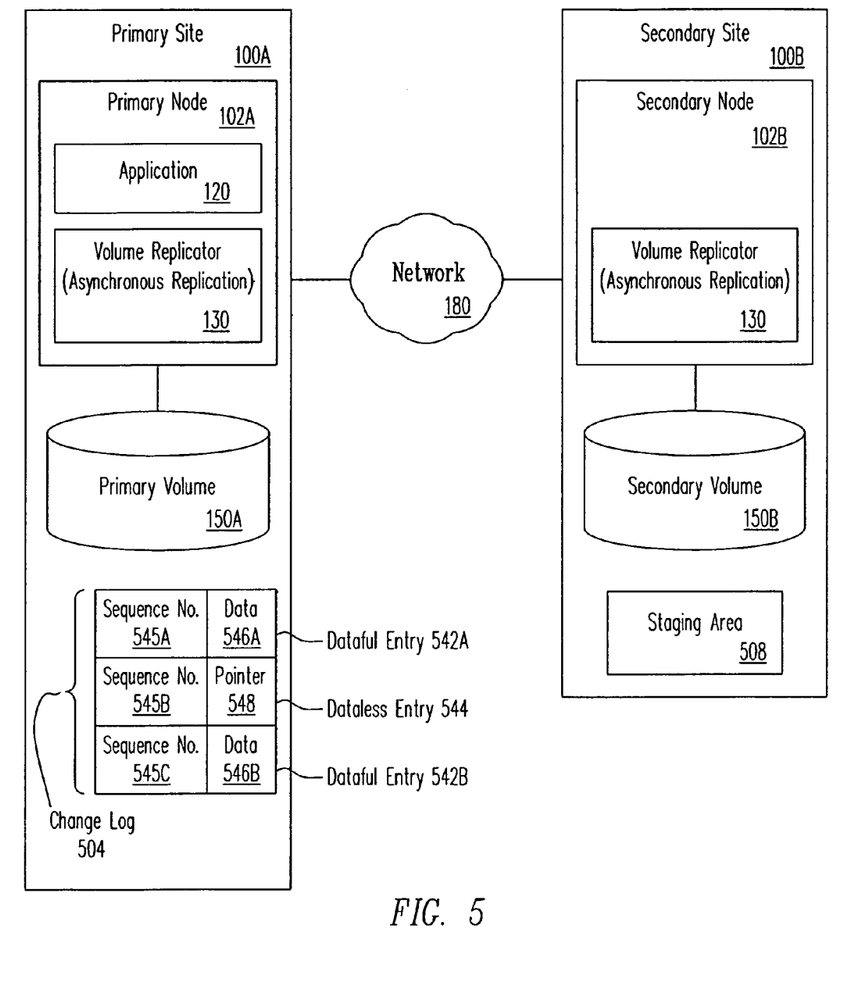
FIG. 5 shows a system that performs asynchronous replication, according to an embodiment of the present invention.

FIG. 5 illustrates a system configured to perform asynchronous replication. In this example, primary site 100A includes primary node 102A, primary volume 150A, and change log 504 (change log 504 may be implemented on another data volume maintained in addition to primary volume 150A). Primary node 102A includes an application 120 and volume replicator 130, which is configured to perform asynchronous replication in this example. Secondary site 100B includes secondary node 102B, secondary volume 150B, and staging area 508.

Change log 504 is used to record changes to the primary volume 150A that are initiated subsequent to a point in time at which the primary volume 150A and the secondary volume 150B are synchronized. Change log 504 is implemented as an append-only circular queue in some embodiments. Change log 504 contains several entries: dataful entry 542A, dataful entry 542B, and dataless entry 544. Each of dataful entries 542A and 542B and dataless entry 544 stores a sequence number used to order the changes indicated by each entry relative to each other. Each successive change to which an entry is allocated is assigned a successive sequence number (in some situations, such as when two parallel writes are applied in parallel to primary volume 150A, two entries can be assigned the same sequence number). Dataful entry 542A stores sequence number 545A, dataless entry 544 stores sequence number 545B, and dataful entry 542B stores sequence number 545C.

Dataful entries 542A and 542B each store data (depicted in FIG. 5 as data 546A and 546B, referred to in the aggregate as data 546), which represents a change to a region of the primary volume. Data 546 can include the new value of that region as a result of the change. For example, if dataful entry 642A is allocated in response to a write operation initiated by application 120, data 546A in dataful entry 542A can include, for example, information identifying a write command, the address of the region targeted by the write command, and/or the new value to be written to that region. Volume replicator 130 can allocate a dataful entry in change log 504 in response to each change initiated by application 120. Volume replicator 130 can allocate dataless entry 544 to record changes caused by a restore operation.

In some embodiments, dataful entries 542A and 542B are the same size as dataless entry 544, and each entry in change log 504 is allocated as either a dataless entry or a dataful entry. For example, if change log 504 is an append-only log, the entry at the end of the log is allocated as a dataful entry if the next change to primary volume 150A is caused by a write initiated by application 120 or as a dateless entry if the next change to primary volume 150A is caused by a restore operation.

When primary volume 150A is restored, volume replicator 130 can allocate a single dataless entry to the restore operation and assigns the next successive sequence number to the dataless entry allocated to the restore operation. Assigning the entry a sequence number records the order of the changes caused by the restore operation relative to the order of other changes to which change log entries have been allocated. Alternatively, volume replicator 130 can record the order of the changes caused by the restore operation by allocating multiple dataless change log entries, each of which have the same sequence number, to the restore operation.

Dataless entry 544 stores pointer 548 or other information identifying data stored in a different location than change log 504 (this data can be stored in a different logical data volume or physical disk than change log 504, or in a different part of the same logical data volume or physical disk as change log 504). This data identifies changes to one or more regions of primary volume by identifying the address of each of the region(s) and the new value of (or the location of the new value of) the each of those region(s). For example, pointer 548 can point to information that includes a volume map identifying each region of primary volume 150A changed by the restore operation. The information pointed to by pointer 548 can also point to information indicating whether the new value of each region modified by the restore operation has already been applied to primary volume 150A or whether the new value should be retrieved from a point-in-time copy from which the primary volume is being restored. It is noted that in some embodiments, the use of dataless entries for restore operations allows multiple changes due to a restore operation to be represented in by a single entry in change log 504, even if there is not enough room in a single change log entry to store the address of and/or the new values of each region affected by all of those changes.

While volume replicator 130 is recording changes to primary volume 150A using change log 504, volume replicator 130 is also performing replication by applying changes recorded in change log 504 to secondary volume 150B. Volume replicator selects the oldest entry (e.g., the entry having a sequence number representing the earliest ordered change that has not yet been replicated) and applies the change recorded by that entry to secondary volume 150A. After the change has been applied to the secondary volume, volume replicator 130 removes the entry allocated to that change from change log 504 (e.g., by advancing a pointer, associated with secondary volume 150B, to the next entry in change log 504 to indicate that the next entry is now the oldest entry in change log 504). Alternatively, a dataless entry can be created in change log 504 to indicate that the change has been applied to the secondary volume. It is noted that if each entry in a group of entries is assigned the same sequence number, volume replicator 130 can apply all of the changes indicated by that group of entries to secondary volume 150B as an atomic operation.

If a dataless entry is the oldest entry in change log 504, volume replicator 130 uses the pointer 548 stored in dataless entry 544 to identify which regions of primary volume 150A were modified by a restore operation. For example, pointer 548 may include a pointer to a volume map (similar to those included in the snappoints used in periodic replication) that indicates which regions of primary volume 150A differed from corresponding regions of the point-in-time copy from which primary volume 150A was restored. In another embodiment, pointer 548 includes information identifying each extent of primary volume 150A that was modified by the restore operation. Based on this information, volume replicator 130 transfers the new values (as a result of the restore operation) of the identified regions to secondary site 100B via network 180. Volume replicator 130 can obtain these values by reading from primary volume 150A (or from a snapshot of primary volume 150A). If the restore operation was an instant restore operation, and if the background activity implementing the instant restore operation has not yet completed, at least some of these reads may be redirected to the point-in-time copy from which primary volume 150A was restored.

As the new values are transferred to secondary site 1001B, volume replicator 130 stores these values in staging area 508. Staging area 508 is implemented as a log in some embodiments. As data is transferred to secondary site 100B, that data is appended to the log.

In other embodiments, staging area 508 is a snapshot of secondary volume 150B. This snapshot is created after the most recent change prior to the change associated with the dataless entry is applied to secondary volume 150B and before any of the change(s) associated with the dataless entry are applied. As data is transferred to secondary site 100B, that data is applied to the snapshot.

Once all of the new values of the regions identified by dataless entry 544 have been copied to staging area 508 at secondary site 100B, volume replicator 130 applies the changes to secondary volume 150B. Volume replicator 130 applies these changes as a single atomic operation in some embodiments. For example, in one embodiment, staging area 508 is a snapshot of secondary volume 150B. Volume replicator 130 performs an instant restore operation to restore secondary volume 150B from the snapshot once all of the data has been applied to the snapshot. This instant restore operation atomically applies all of the changes to secondary volume 150B. Alternatively, if staging area 508 is a log, volume replicator 130 can apply all of the changes in the log to secondary volume 150B as an atomic operation. Until all of the changes in the log have been applied, volume replicator 130 cannot apply any subsequent changes (e.g., indicated in other dataful entries within change log 504) to the secondary volume.

While the data corresponding to the restore operation is being sent to secondary site, volume replicator 130 continues to detect changes to primary volume 150A and to allocate appropriate entries in change log 504 for each detected change. Accordingly, volume replicator 130 is able to record the order of these changes by assigning each entry an appropriate sequence number. As soon as volume replicator 130 finishes transferring the data corresponding to the restore operation to the secondary site 100B, volume replicator 130 may begin transferring data corresponding to subsequent changes to the secondary site 10A. Since changes are applied in order, consistency of secondary volume 150B with respect to a known state of primary volume 150A is maintained.

Figure 6:
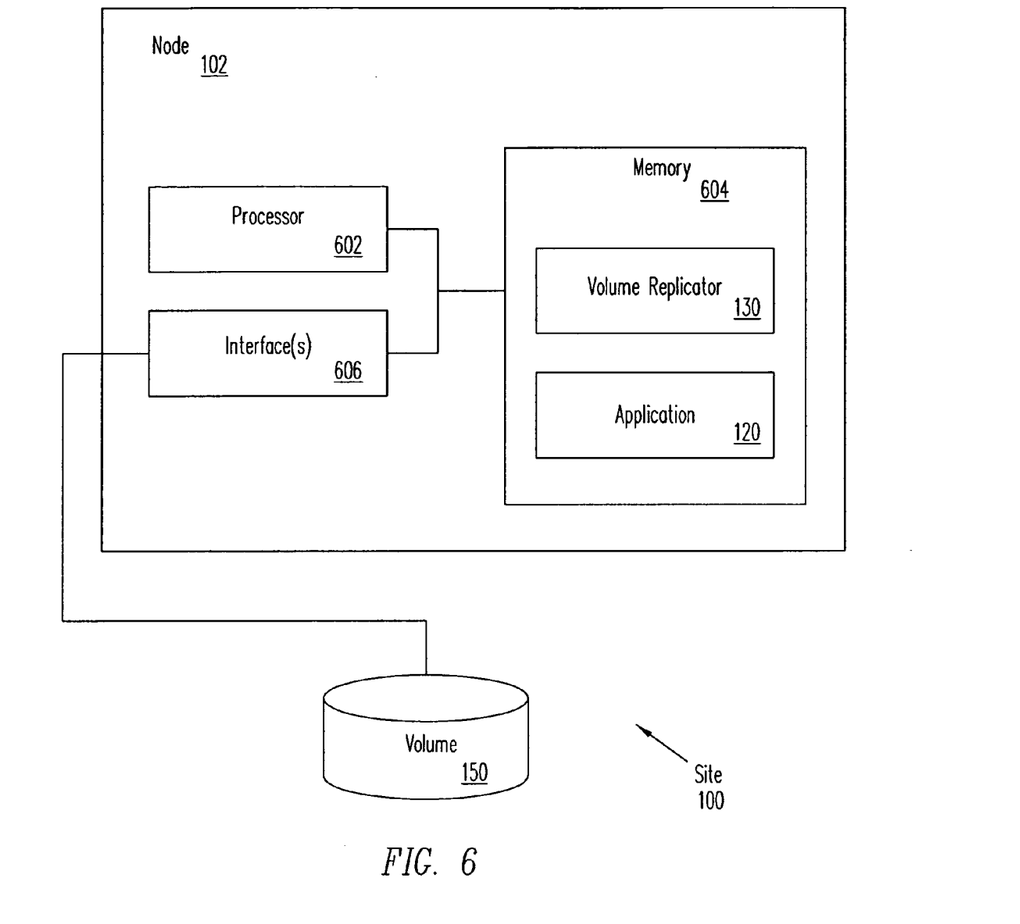
FIG. 6 is a block diagram of a site that can be involved in replication, according to an embodiment of the present invention.

FIG. 6 is a block diagram of site 100 illustrating how volume replicator 130 and/or application 120 can be implemented in software. As illustrated, node 102 includes one or more processors 602 (e.g., microprocessors, PLDs (Programmable Logic Devices), or ASICs (Application Specific Integrated Circuits)) configured to execute program instructions stored in memory 604. Memory 604 can include various types of RAM (Random Access Memory), ROM (Read Only Memory), Flash memory, MEMS (Micro Electro-Mechanical Systems) memory, and the like. Node 102 also includes one or more interfaces 606. Processor 602, interface 604, and memory 606 are coupled to send and receive data and control signals by a bus or other interconnect.

Interface(s) 606 can include an interface to the storage devices on which data volume 150 (e.g., primary volume 150A or secondary volume 150B, as shown in FIGS. 1, 3, and 5) is implemented, as shown in FIG. 6. Such storage devices can also store data such as a snappoint or change log for use by volume replicator 130 (all or part of this information can also be stored in memory 604). Interface(s) 606 can also include an interface to network 180 (as shown in FIGS. 1, 3, and 5), for use in communicating with a node at another site when performing replication of data to or from that site.

The program instructions and data implementing volume replicator 130 and application 120 can be stored on various computer readable media such as memory 604. In some embodiments, volume replicator and application software is stored on a computer readable medium such as a CD (Compact Disc), DVD (Digital Versatile Disc), hard disk, optical disk, tape device, floppy disk, and the like). In order be executed by processor 602, the instructions and data implementing volume replicator 130 and application 120 are loaded into memory 606 from the other computer readable medium. The instructions and/or data implementing can also be transferred to node 102 for storage in memory 606 via a network such as the Internet or upon a carrier medium. In some embodiments, a computer readable medium is a carrier medium such as a network and/or a wireless link upon which signals such as electrical, electromagnetic, or digital signals, on which the data and instructions implementing volume replication 130 and application 120 are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A computing-device-implemented method, comprising:
   replicating a first change made to a primary volume, wherein
      the first change is replicated to a secondary volume; and
   replicating a second change made to the primary volume, wherein
      the second change is replicated to the secondary volume,
      the second change is caused by a restore operation, and
      the replicating the second change comprises recording an order of the second change relative to the first change.

2. The method of claim 1, wherein
   the replicating the first change comprises performing periodic replication; and
   the replicating the second change comprises updating a volume map to indicate that a region of the secondary volume, which corresponds to a region of the primary volume changed by the restore operation, should be synchronized with the primary volume during a next period of said performing periodic replication.

3. The method of claim 1, wherein
   the replicating the first change comprises performing asynchronous replication,
   the replicating the second change comprises allocating an entry corresponding to the restore operation in a log of changes to the primary volume, and
   the entry includes information indicating the order of the second change relative to the order of the first change.

4. The method of claim 1, wherein
   the replicating the first change comprises
      recording in a next snappoint one or more changes between a current snappoint and the primary volume while one or more changes indicated in the current snappoint are applied to the secondary volume,
      converting the next snappoint to the current snappoint,
      creating a new next snappoint at a subsequent point in time, and
      periodically repeating the recording, the converting, and the creating; and
   the replicating the second change comprises updating the next snappoint to indicate one or more regions of the primary volume modified by the restore operation.

5. The method of claim 4, wherein
   the updating the next snappoint comprises
      logically ORing a bitmap comprised in the next snappoint with a restore bitmap; and
   the restore bitmap indicates the one or more regions of the primary volume modified by the restore operation.

6. The method of claim 1, wherein
   the replicating the first change comprises
      maintaining a log of changes applied to the primary volume, wherein the log records an order of the changes, and
      applying each of the changes maintained in the log to the secondary volume in the order recorded in the log; and
   the replicating the second change comprises
      allocating an entry in the log, wherein the entry corresponds to the second change, and
      updating the order recorded in the log to indicate the order of the second change relative to other changes recorded by the log.

7. The method of claim 6, further comprising
applying a plurality of changes to the secondary volume as a single atomic operation before applying any subsequently-ordered changes recorded by the log to the secondary volume, wherein
the plurality of changes is caused by the restore operation, and
the plurality of changes comprises the second change.

8. The method of claim 7, further comprising
storing data to be applied to the secondary volume in a secondary log, wherein
the data includes values of one or more regions of the primary volume as a result of the restore operation, and
the entry corresponding to the change includes a pointer to the data in the secondary log.

9. The method of claim 7, further comprising applying to a snapshot of the secondary volume the plurality of changes; wherein the applying the plurality of changes to the secondary volume as the single atomic operation comprises performing an instant restore operation, and the instant restore operation restores the secondary volume from the snapshot.

10. The method of claim 1, wherein
said replicating the second change comprises applying the second change to the secondary volume independently of performance of background activity to implement the second change on the primary volume.

11. A computer program product comprising:
a computer readable storage medium, wherein the computer readable storage medium comprises program instructions executable by a computing device to:
replicate a first change made to a primary volume, wherein
the first change is replicated to a secondary volume; and
replicate a second change made to the primary volume, wherein
the second change is replicated to the secondary volume,
the second change is caused by a restore operation, and
the program instructions are executable to record an order of the second change relative to the first change.

12. The computer program product of claim 11, wherein the program instructions are executable by a computing device to:
perform periodic replication, wherein
the periodic replication replicates the first change and the second change, and
replicating the second change comprises updating a volume map to indicate that a region of the secondary volume, which corresponds to a region of the primary volume changed by the restore operation, should be synchronized with the primary volume during a next period of periodic replication.

13. The computer program product of claim 11, wherein the program instructions are executable by a computing device to:
perform asynchronous replication, wherein
the asynchronous replication replicates the first change and the second change,
replicating the second change comprises allocating an entry corresponding to the restore operation in a log of changes to the primary volume, and
the entry includes information indicating the order of the second change relative to the order of the first change.

14. A system, comprising:
a processor; and
a memory storing program instructions executable by the processor to:
replicate a first change made to a primary volume, wherein
the first change is replicated to a secondary volume; and
replicate a second change made to the primary volume, wherein
the second change is replicated to the secondary volume,
the second change is caused by a restore operation, and
the program instructions are executable to record an order of the second change relative to the first change.

15. The system of claim 14, wherein the program instructions are executable by the processor to:
perform periodic replication, wherein
the periodic replication replicates the first change and the second change, and
replicating the second change comprises updating a volume map to indicate that a region of the secondary volume, which corresponds to a region of the primary volume changed by the restore operation, should be synchronized with the primary volume during a next period of periodic replication.

16. The system of claim 15, wherein
the updating the next snappoint comprises logically ORing a bitmap comprised in the next snappoint with a restore bitmap; and
the restore bitmap indicates the one or more regions of the primary volume modified by the restore operation.

17. The system of claim 14, wherein the program instructions are executable by the processor to:
perform asynchronous replication, wherein
the asynchronous replication replicates the first change and the second change,
replicating the second change comprises allocating an entry corresponding to the restore operation in a log of changes to the primary volume, and
the entry includes information indicating the order of the second change relative to the order of the first change.

18. The system of claim 17, wherein
the replicating the first change comprises
maintaining a log of changes applied to the primary volume, wherein the log records an order of the changes, and
applying each of the changes maintained in the log to the secondary volume in the order recorded in the log; and
the replicating the second change comprises
allocating an entry in the log, wherein
the entry corresponds to the second change, and
updating the order recorded in the log to indicate the order of the second change relative to other changes recorded by the log.

19. The system of claim 18, wherein the program instructions are executable by the processor to:
store data to be applied to the secondary volume in a secondary log, wherein the data includes values of one or more regions of the primary volume as a result of the restore operation, and the entry corresponding to the change includes a pointer to the data in the secondary log.

20. The system of claim 19, wherein the program instructions are executable by the processor to:

apply to a snapshot of the secondary volume a plurality of changes; wherein applying the plurality of changes to the secondary volume comprises performing a single atomic operation by performing an instant restore operation, and the instant restore operation restores the secondary volume from the snapshot.

21. A system, comprising:

a primary volume;

a secondary volume;

a computing device comprising:

means for replicating the primary volume to the secondary volume, wherein the means for replicating record an order of first change to the primary volume relative to an order of a second change to the primary volume, and the second change is due to the primary volume being restored from a point-in-time copy of the primary volume.

22. The system of claim 21, wherein the means for replicating perform periodic replication, the periodic replication replicates the first change and the second change, and replicating the second change comprises updating a volume map to indicate that a region of the secondary volume, which corresponds to a region of the primary volume changed by the restore operation, should be synchronized with the primary volume during a next period of periodic replication.

23. The system of claim 21, wherein the means for replicating perform asynchronous replication, the asynchronous replication replicates the first change and the second change, replicating the second change comprises allocating an entry corresponding to the restore operation in a log of changes to the primary volume, and the entry includes information indicating the order of the second change relative to the order of the first change.

24. A system, comprising:

a primary volume, a secondary volume, a primary computing device coupled to access the primary volume; and a secondary computing device coupled to the primary computing device by a network and coupled to access the secondary volume, wherein the secondary computing device maintains the secondary volume as a replica of the primary volume, the primary computing device is configured to record an order of a first change to the primary volume relative to a second change to the primary volume, the second change is caused by restoring the primary volume from a point-in-time copy of the primary volume; and the secondary computing device is configured to apply the first change and the second change to the secondary volume in the order recorded by the primary computing device.

\* \* \* \* \*